Patented Oct. 11, 1949

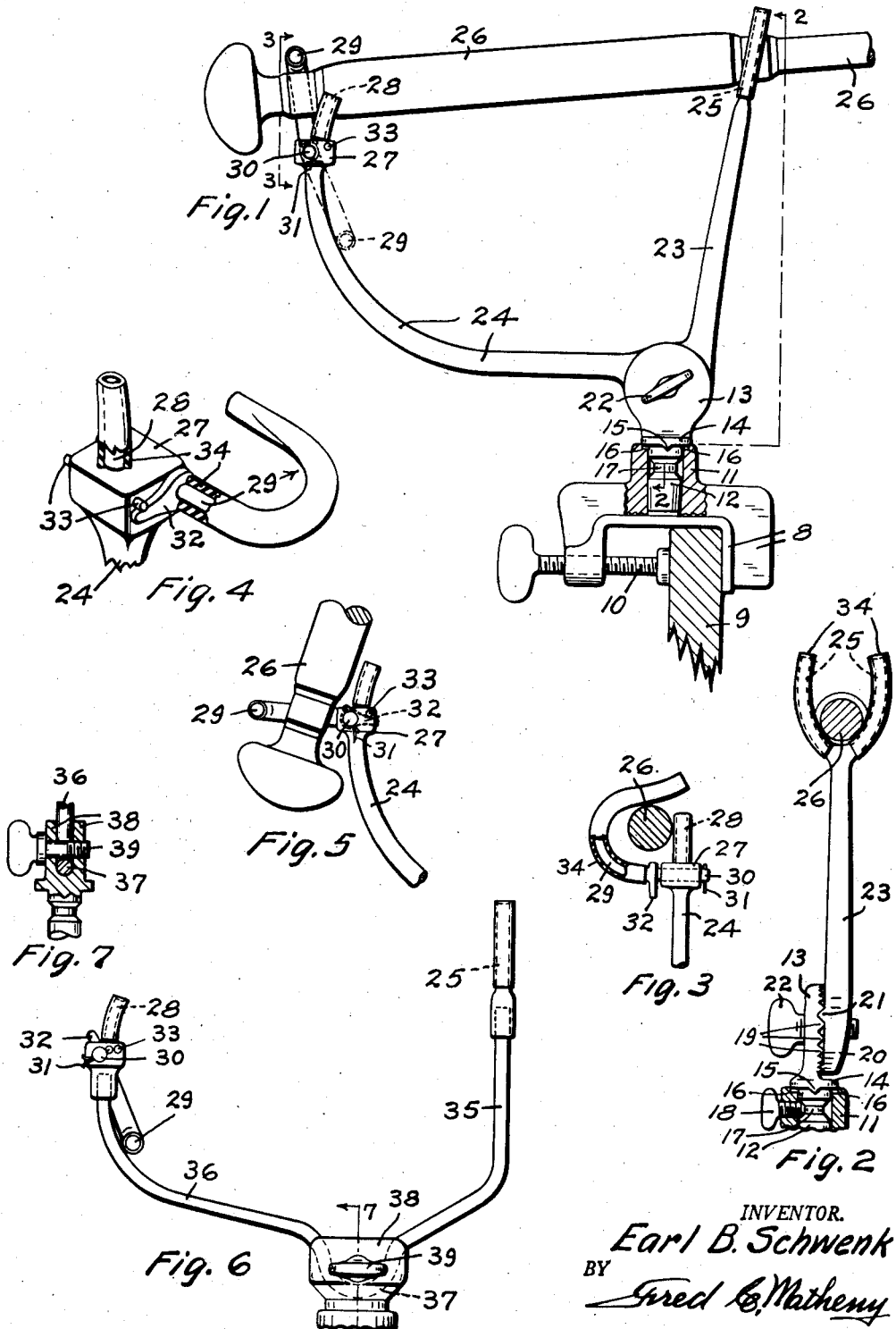

2,484,427

UNITED STATES PATENT OFFICE 2,484,427

FISHING ROD HOLDER

Earl B. Schwenk, Seattle, Wash.

Application October 12, 1946, Serial No. 702,934

4 Claims. (Cl. 248—42)

This invention relates to a fishing rod holder of a type adapted to be attached to the gunwale of a fishing boat or to a similar support to receive and hold a fishing rod.

An object of this invention is to provide a fishing rod holder that is very convenient for a fisherman to use because a fishing rod can be very quickly and easily inserted into or removed from said holder by the use of one hand only.

Another object is to provide fishing rod holder that will hold the rod firmly and securely so that there will be no danger of the rod being pulled out of the holder by the pull of a fish.

Another object is to provide a fishing rod holder that is quickly and easily adjustable on both a vertical and a horizontal axis so as to hold a rod in any desired position.

Another object is to provide a fishing rod holder having two upwardly extending spaced apart arms with an upwardly opening fork on the upper end portion of the foremost bracket arm and a pivotally mounted hook connected with the upper end portion of the rearmost bracket arm, said hook extending sidewise from the rearmost bracket arm and being pivotally movable between a rod holding position and a position in which a rod can be very quickly inserted in or removed from said hook.

Other objects of the invention will be apparent from the following description taken in connection with the accompanying drawings.

In the drawings Figure 1 is a side elevation, with parts in section, of a fishing rod holder constructed in accordance with this invention showing the same mounted on a support such as a side rail or gunwale of a fishing boat.

Fig. 2 is a view of the same in front elevation, with parts in section, taken substantially on broken line 2—2 of Fig. 1, parts being omitted.

Fig. 3 is a view in elevation, with parts in section, taken substantially on broken line 3—3 of Fig. 1.

Fig. 4 is a fragmentary perspective view, with parts in section, of readily releasable fishing holding means constructed in accordance with this invention.

Fig. 5 is a fragmentary view in elevation illustrating a pivotally mounted hook member in a position in which a fishing rod can be very quickly and easily engaged therewith or removed therefrom.

Fig. 6 is a side elevation of a modified form of fishing rod holder constructed in accordance with this invention.

Fig. 7 is a fragmentary sectional view taken substantially on broken line 7—7 of Fig. 6.

Like reference numerals designate like parts throughout the several views.

The mounting means for this rod holder is in the form of a clamp member 8 of inverted U shape. The clamp member 8 is adapted to fit over any suitable support such as the side rail or gunwale 9 of a fishing boat and said clamp member 8 carries a thumb screw 10 by which it can be clamped to the support 9. The clamp member 8 is further provided with a tubular socket 11 positioned at right angles to the screw 10 so that it will extend upwardly from the clamp member 8 when said clamp member is in an operative position as shown in Figs. 1 and 2.

The socket 11 is adapted to receive a cylindrical stem 12 that carries an upwardly extending disc shaped plate 13. A normally horizontal circular flange 14 is provided between the stem 12 and plate 13. The flange 14 is adapted to rest on the top of the socket 11 and is preferably provided with one or more downwardly extending teeth 15 that are adapted to interfit with grooves or recesses 16 in the top of the socket 11. The stem 12 has an annular groove 17 for the reception of the end portion of a locking screw 18, Fig. 2, by which the stem 12 can be locked in any desired position in the socket 11.

The disc shaped plate 13 has radial corrugations or teeth 19 on one side and the toothed side of said plate 13 is disposed in face to face engagement with a plate portion 20 of a rod holding bracket. The plate portion 20 has one or more teeth 21, see Fig. 2, that interfit with the teeth 19 on the plate 13 to help in locking the two plate members 13 and 20 against relative angular movement. A thumb screw 22 extends through the two plates 13 and 20 and is threaded into one of said plates such as plate 20 to adjustably secure said two plates together.

The rod holding bracket is provided with two arms 23 and 24 that are rigid with the plate portion 20 and extend outwardly from said plate 20 in spaced apart relation. The arm 23 is the front arm of the bracket and is herein referred to as the foremost arm. This foremost arm 23 extends in a generally upward direction from the plate 20 and terminates in an upwardly opening fork 25 wherein a fishing rod 26 is adapted to rest.

The rearmost bracket arm 24 preferably extends in a generally horizontal rearward direction away from the plate member 20 for a substantial distance and is thence curved upwardly and provided near its upper end with an enlarged bearing portion 27. A rod holding pin member 28 is rigid with the bearing portion 27 and extends upwardly therefrom in prolongation of the arm 24. The shape of the bearing portion can be varied as desired.

A hook 29 for engaging with and holding a fishing rod is pivotally connected with the bearing portion 27 and extends sidewise therefrom in a generally horizontal direction, as shown in Fig. 4. A shank portion 30 of the hook 29 extends through a transverse hole in the bearing portion 27 and is retained in said hole by a cotter pin 31. A stop arm 32 is fixedly secured to the shank 30 of the hook 29, far enough from the end of said shank so that said stop arm 32 will properly position the hook 29 transversely of the rearmost bracket arm 24. A cross pin 33 is press fitted into the bearing member 27 and projects from two opposite sides or faces of said member 27 in the path of movement of the stop arm 32. When the hook 29 is in the position in which it is shown in Figs. 4 and 5 the stop arm 32 will be in engagement with the cross pin 33 and the hook will be stopped in a position in which a rod 26 can be quickly and easily engaged with or disengaged from said hook.

It is intended that the hook 29 can be used on either side of the bracket, depending on which side of a boat the rod holder is used on. The hook 29 can be quickly and easily moved from one side to the other of the member 27 by first removing the cotter pin 31, then withdrawing the shank 30 of the hook 29 from the hole in the member 27, then inserting it in said hole from the other side and replacing the cotter pin.

Preferably the hook 29 and the pin 28 and the branches of the rod receiving fork 25 are all covered with rubber tubing 34 to minimize wear of the fish rod, reduce the liability of noise and provide better holding surfaces for contacting the rod.

In the use of this rod holding device the clamp 3 is made fast to a suitable support 9 so that the forked rod holding bracket is supported in an upright position. When the hook 29 is in the rearwardly extending position in which it is shown in Figs. 4 and 5 a fishing rod 26 can be very quickly and easily placed in the rod holder by holding the fishing rod in a generally upright position as shown in Fig. 5, passing the handle portion of said rod sidewise into the hook 29 then lowering the rod into the position shown in Fig. 1 so that said rod rests in the fork 25. In this position shown in Fig. 1 the rod is held within the hook 29 and between the hook 29 and the upwardly extending pin 28.

The fishing rod can be as quickly and as easily removed from the rod holder by grasping said rod 26 and tilting it upwardly enough so that the rod 26 clears the upwardly extending pin 28 and then pulling the handle portion of the rod sidewise out of the hook 29. Thus the rod can be very quickly and easily engaged with or disengaged from the rod holder by the use of one hand only.

When a rod is removed from the holder the hook 29 will ordinarily be left in the rearwardly extending rod receiving position in which it is shown in Fig. 4.

The hook 29 can be moved into the position in which it is shown by dot and dash lines in Fig. 1 and the rod 26 engaged with the hook 29 in this position if desired. However the hook will ordinarily not be used in this position.

In the rod holder shown in Figs. 6 and 7 the two arms 35 and 36 of the rod holding bracket are made from one piece of cylindrical metal which has a curved portion 37 at the location where it is connected with a forked mounting bracket 38. A thumb screw 39 passes slidably through one fork of the mounting bracket 38 and is threaded into the other fork of the same. The curved portion 37 of the rod holding bracket passes under this thumb screw 39. The forks of the mounting bracket 38 have enough resiliency so that they will clamp and hold the curved portion 37 of the rod holding bracket when the thumb screw 39 is tightened. When said thumb screw 39 is loosened the rod holding bracket can be tiltingly adjusted in a plane common to the two arms 35 and 36 of the same. The parts shown in Fig. 6 that are adapted to engage with the fishing rod are similar to those shown in Figs. 1 to 5 and are correspondingly numbered. The hook 29 is shown in an inoperative position in Fig. 6.

The operation of the rod holder shown in Figs. 6 and 7 is similar to the operation of the rod holder shown in Figs. 1 to 5.

Obviously changes in this rod holder can be made within the scope and spirit of the following claims.

I claim:

1. A fishing rod holder comprising a bracket having two upwardly extending spaced apart arms; an upwardly opening rod receiving fork carried by the upper end portion of the foremost bracket arm; and a substantially U-shaped rod receiving hook carried by the rearmost bracket arm and having two side members positioned transversely as respects the common plane of said two bracket arms with one of said side members extending crosswise of the rearmost bracket arm and pivotally supported by said rearmost bracket arm a short distance below the upper end thereof, leaving a portion of said rearmost bracket arm extending above the pivotal bearing of said hook for cooperation with said hook to receive and hold a fishing rod.

2. A fishing rod holder comprising a bracket having two upwardly extending spaced apart arms; an upwardly opening rod receiving fork carried by the upper end portion of the foremost bracket arm; a bearing member rigid with the upper end portion of the rearmost bracket arm; a pin member extending above said bearing member; and a substantially U-shaped hook having the end portion of one of its side members journaled in said bearing member transversely of said rearmost bracket arm and supporting said hook for pivotal movement with the hook extending sidewise from said rearmost bracket arm, said hook and said pin cooperating to receive and hold a fishing rod.

3. A fishing rod holder comprising a bracket having two upwardly extending spaced apart arms; an upwardly opening rod receiving fork carried by the upper end portion of the foremost bracket arm; a bearing member rigid with the upper end portion of the rearmost bracket arm; a pin member extending above said bearing member; a substantially U-shaped hook having the end portion of one of its sides journaled in said bearing member transversely of said rearmost bracket arm and supporting said hook for pivotal movement with the hook extending sidewise from said rearmost bracket arm; the point of said hook being movable in a path close to but clear of said upwardly extending pin member; and stop means rigid with said rearmost bracket arm and positioned adjacent to said hook limiting angular movement of said hook and positioning said hook at substantially right angles to the upper end portion of said rearmost bracket arm to conveniently receive a fishing rod.

4. A fishing rod holder comprising a bracket having two upwardly extending spaced apart arms; means supporting said bracket for adjustment about an upright and a horizontal axis; an upwardly opening rod receiving fork carried by the upper end portion of the foremost bracket arm; a bearing member rigid with the upper end portion of the rearmost bracket arm; a rod engaging pin member extending upwardly from said bearing member; a substantially U-shaped hook member having one side portion extended to form a bearing shank that is journaled in said bearing member to provide for pivotal movement of said hook member on an axis transverse to said rearmost bracket arm; the point of said hook member being movable past said pin member in a path close to said pin member, said hook member and said pin member being adapted to cooperate in holding a fishing rod; a stop member rigid with said bearing member and a stop arm rigid with bearing shank adapted to engage with said stop member and hold said hook member in a rearwardly extending position relative to said rearmost arm whereby a fishing rod can be easily engaged within and removed from said hook member.

EARL B. SCHWENK.

REFERENCES CITED

The following references are of record in the file of this patent:

UNITED STATES PATENTS

| Number | Name | Date |
|---|---|---|
| 417,997 | Dupuis | Dec. 24, 1889 |
| 565,001 | Horton | Aug. 4, 1896 |
| 1,025,657 | Towne | May 7, 1912 |
| 1,992,165 | Bardon | Feb. 26, 1935 |
| 2,202,739 | Kilby | May 28, 1940 |

FOREIGN PATENTS

| Number | Country | Date |
|---|---|---|
| 596,336 | France | Aug. 8, 1925 |